United States Patent
St. Aubin et al.

(10) Patent No.: US 7,614,223 B2
(45) Date of Patent: Nov. 10, 2009

(54) METHOD FOR OPERATING A MULTIPLE SPEED HYDRAULIC MOTOR

(75) Inventors: Joseph A. St. Aubin, Wahpeton, ND (US); Jeret L. Hoesel, Lisbon, ND (US); Walter K. Rolf, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 278 days.

(21) Appl. No.: 11/731,814

(22) Filed: Mar. 30, 2007

(65) Prior Publication Data

US 2008/0236153 A1  Oct. 2, 2008

(51) Int. Cl.
*F16D 31/02* (2006.01)

(52) U.S. Cl. .......................................... 60/327; 60/329

(58) Field of Classification Search ............... 60/327, 60/328, 329
See application file for complete search history.

(56) References Cited

U.S. PATENT DOCUMENTS

| 4,624,333 A | 11/1986 | Minor |
| 4,951,466 A | 8/1990 | Macht |
| 5,251,440 A | 10/1993 | Bong-dong et al. |
| 6,389,808 B1 | 5/2002 | Sakai |
| 6,544,018 B2 | 4/2003 | Heckel et al. |
| 6,679,691 B1 | 1/2004 | Barto et al. |
| 6,827,562 B1 | 12/2004 | Barto |

FOREIGN PATENT DOCUMENTS

DE  41 35 016 A1  4/1993

OTHER PUBLICATIONS

Hydrostatic transmissions product information on http://www.hydraulicspneumatics.com.
VIS Motor Series product information on http://www.eatonhydraulics.com.
Search Report and Written Opinion dated Jul. 16, 2008 for International application No. PCT/US2008/003631.

*Primary Examiner*—Michael Leslie
(74) *Attorney, Agent, or Firm*—John D. Veldhuis-Kroeze; Westman, Champlin & Kelly, P.A.

(57) ABSTRACT

A method of operating a hydraulic motor. In one embodiment, the method includes measuring a temperature of hydraulic fluid associated with the hydraulic motor and comparing the measured temperature of the hydraulic fluid to a first temperature threshold. The method also includes controlling an operational state of one or more hydraulic motor functions based at least partially on the comparison of the measured temperature of the hydraulic fluid and the first temperature threshold.

14 Claims, 7 Drawing Sheets

METHOD FOR OPERATING A MULTIPLE SPEED HYDRAULIC MOTOR

BACKGROUND

The present invention relates to a method for operating a multiple speed hydraulic motor. The present invention may be used, for example, in a compact construction vehicle such as a skid steer loader.

Compact construction vehicles typically include a prime mover, such as an internal combustion engine, which drives a hydraulic system. The hydraulic system includes hydraulic pumps that supply hydraulic fluid to hydraulic cylinders for raising and lowering lift arms, curling and dumping a bucket, and manipulating other auxiliary devices. The hydraulic system also includes one or more pumps that provide a flow of hydraulic fluid to hydraulic motors that rotate the wheels of the vehicle.

In some cases, hydraulic motors can be shifted between two or more operating speeds. For example, some hydraulic motors can be shifted between a low-speed high-torque ("LSHT") mode while the vehicle is performing work and a high-speed low-torque ("HSLT") mode while the vehicle is being driven between worksites. Such motors are shifted between LSHT and HSLT modes by changing the ratio of output shaft rotation to the flow rate of hydraulic fluid supplied by the hydraulic pump in the hydraulic system, instead of requiring the hydraulic system to provide a variable flow rate of hydraulic fluid.

Some types of multiple speed hydraulic motors are prone to premature failure if the motor is permitted to be shifted into a HSLT mode when the hydraulic fluid is too cold and viscous to adequately lubricate the internal friction surfaces of the drive motor. In addition, allowing a HSLT mode when the hydraulic fluid is too cold and viscous can produce a "thermal shock" condition causing pre-mature drive motor failure. This "thermal shock" can be caused by different rates of thermal expansions between components, pockets of high temp oil at certain location of a components or differences in temperature rise rate between components.

Some known hydraulic systems drive the hydraulic motors through a closed hydraulic circuit. There is typically some intentional loss of hydraulic fluid from closed hydraulic circuits to promote cooling of the components, and such loss of fluid can result in cavitation within the circuit which may lead to performance issues or even damage the motor. To alleviate such fluid loss, many hydraulic systems include a charge pump that operates in an open circuit. The charge pump draws fluid out of a reservoir, pressurizes the fluid, and communicates with the closed circuit. As a result, the closed circuit is pressurized by the charge pump to a "charge pressure," and pressurized hydraulic fluid from the charge pump instantly supplements the hydraulic fluid in the closed circuit to make up for fluid losses. Such charge pumps typically operate at constant speed and are always on, whether the motor is in LSHT or HSLT mode of operation.

SUMMARY

In one embodiment, the invention provides a method of operating a hydraulic motor. The method includes measuring a temperature of hydraulic fluid associated with the hydraulic motor; comparing the measured temperature of the hydraulic fluid to a first temperature threshold; and controlling an operational state of one or more hydraulic motor functions based at least partially on the comparison of the measured temperature of the hydraulic fluid and the first temperature threshold.

In another embodiment, the invention provides a method of operating a machine having a hydraulic motor that utilizes hydraulic fluid. The method includes measuring a temperature of the hydraulic fluid and determining whether the temperature of the hydraulic fluid is below a first temperature threshold. The method also includes enabling a flow of hydraulic fluid into a warming flow path when the temperature of the hydraulic fluid is below the first temperature threshold, the warming flow path being independent of a driving flow path used to drive the hydraulic motor. Additionally, the method includes limiting a speed with which the hydraulic motor operates when the temperature of the hydraulic fluid is below the first temperature threshold, and disabling the flow of hydraulic fluid into the second flow path and removing the speed limit upon the temperature of the hydraulic fluid meeting or exceeding the first temperature threshold.

In yet another embodiment, the invention provides a method for controlling a hydraulic system that includes a pump for causing a flow of hydraulic fluid, a motor capable of multiple speed operation in response to the flow of hydraulic fluid, the motor having a lubrication circuit, and brake preventing operation of the motor when the brake is on and permitting operation of the motor when the brake is off. The method includes: (a) determining whether the brake is on; (b) determining whether an operator is requesting operation of the motor at high speed; (c) determining a temperature of the hydraulic fluid; (d) flowing the hydraulic fluid through the warming circuit of the system into the lubrication circuit in the motor upon the determination that the brake is on and the temperature of the hydraulic fluid is below a high limit; (e) flowing the hydraulic fluid through the warming circuit of the system into the lubrication circuit and preventing operation of the motor at high speed upon the determination that the brake is off and the temperature of the hydraulic fluid is below a low limit; (f) alerting the operator that the motor is being prevented from operation at high speed when an operator attempts to operate the motor at high speed operation during step (e); (g) enabling operation of the motor at high speed following step (e) when the temperature of the hydraulic fluid is equal to or above the low limit and while the brake is off; and (h) requiring a confirmatory act of the operator prior to permitting operation of the motor at high speed in the event the operator was alerted during step (f).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
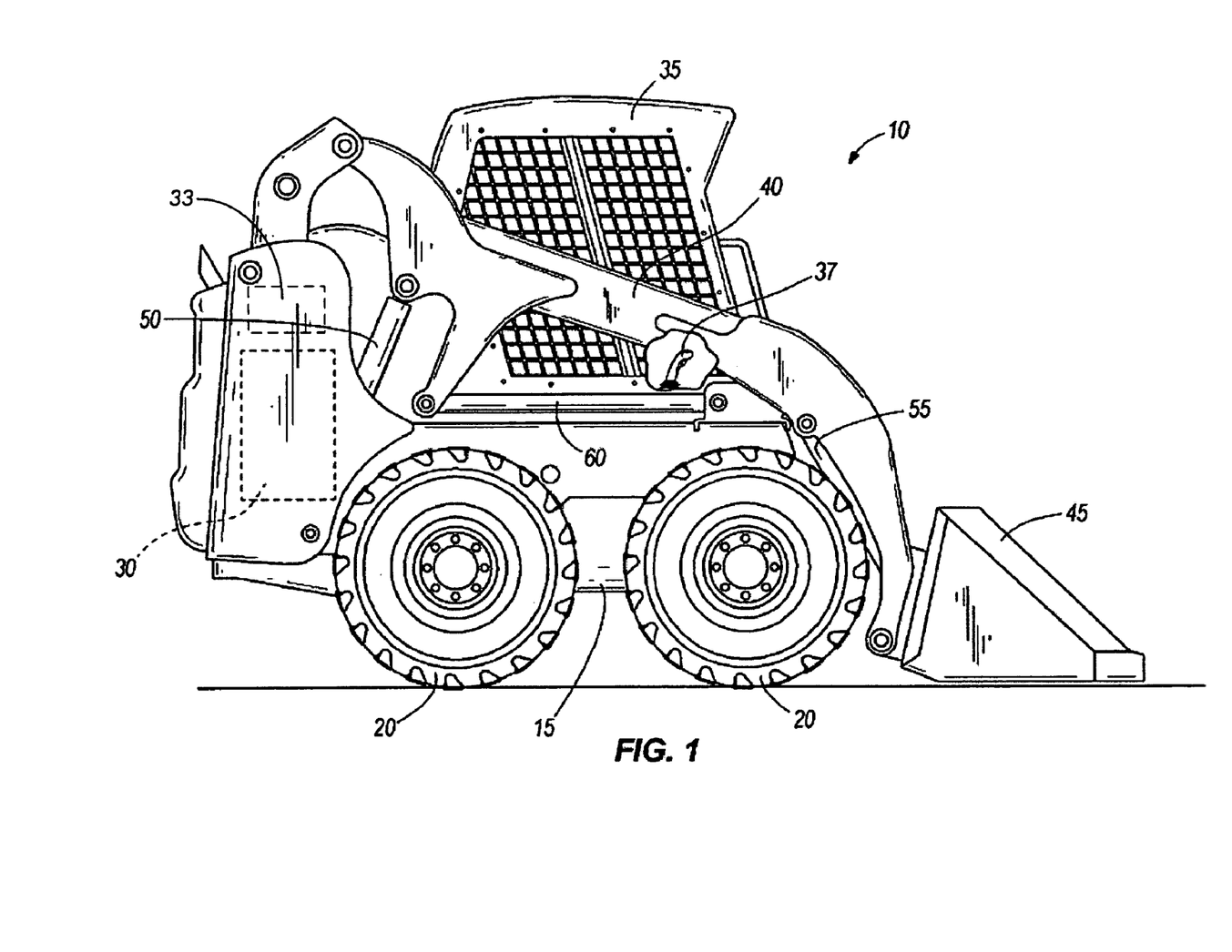
FIG. 1 is a side view of a vehicle including a hydraulic fluid control system.
Figure 2:
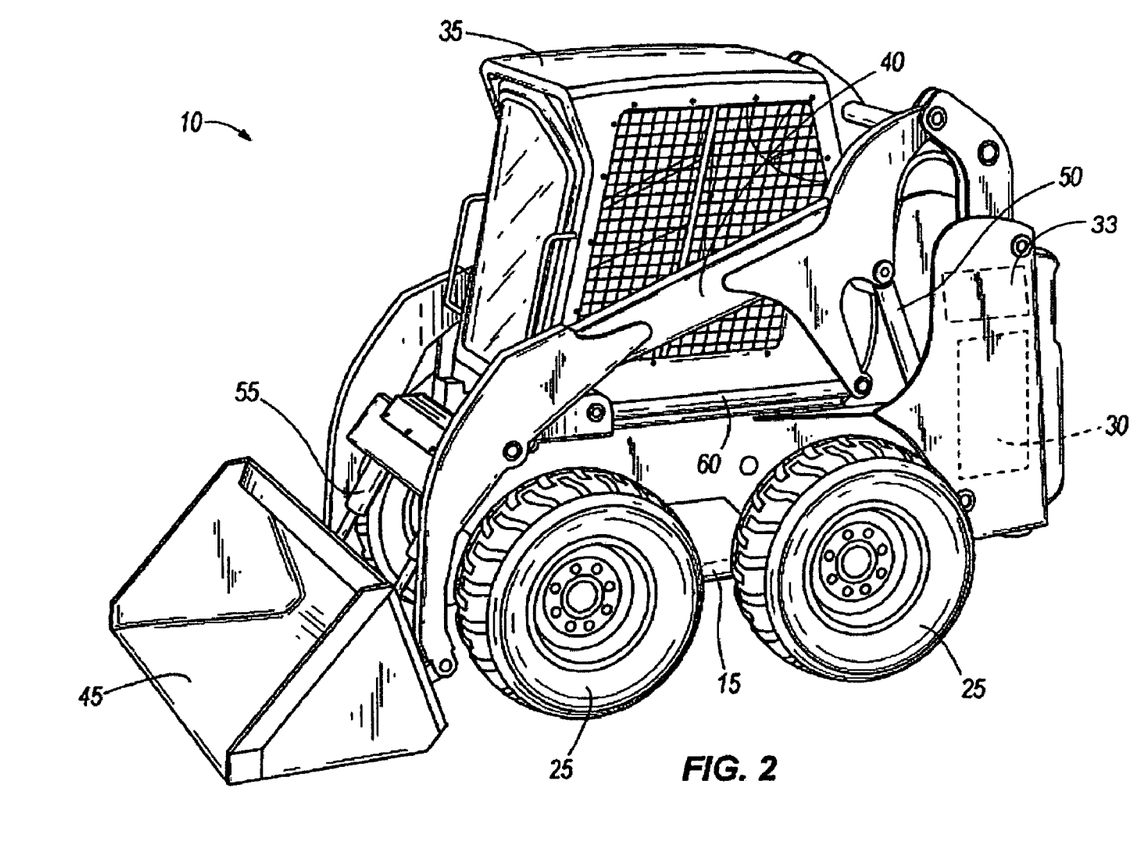
FIG. 2 is a perspective view of the vehicle shown in FIG. 1.

FIGS. 1 and 2 depict a skid steer loader 10 having a frame 15 supported by two right side wheels 20 and two left side wheels 25, an internal combustion engine 30, a hydraulic system 33, an operator compartment 35 that contains a vehicle control 37, a lift arm 40, and a bucket 45 mounted for tilting between the distal ends of the lift arm 40. Although the invention is illustrated embodied in a skid steer loader 10, the invention may be embodied in other vehicles and machines. Although the illustrated vehicle control 37 takes the form of a joystick, in other embodiments, the control may include multiple joysticks, foot pedals, steering wheels, remote controls, and the like.

The right side wheels 20 are driven independently of the left side wheels 25. When all four wheels 20, 25 turn at the same speed, the loader 10 moves forward and backward, depending on the direction of rotation of the wheels 20, 25. The loader 10 turns by rotating the right and left side wheels 20, 25 in the same direction but at different rates, and rotates about a substantially zero turn radius by rotating the right and left side wheels 20, 25 in opposite directions.

The lift arm 40 raises (i.e., rotate counterclockwise in FIG. 1) and lowers (i.e., rotate clockwise in FIG. 1) with respect to the frame 15 under the influence of lift cylinders 50 mounted between the frame 15 and the lift arms 40. The bucket 45 tilts with respect to the lift arm 40 to curl (i.e., rotate counterclockwise in FIG. 1) and dump (i.e., rotate clockwise in FIG. 1) under the influence of tilt cylinders 55 mounted between the lift arm 40 and the bucket 45. Various auxiliary implements or devices may be substituted for or used in conjunction with the bucket 45. An example, but by no means exhaustive, list of auxiliary implements includes augers, jack hammers, trenchers, grapples, rotary sweepers, stump grinders, saws, concrete mixers, pumps, chippers, snow throwers, rotary cutters, and backhoes.

Figure 3:
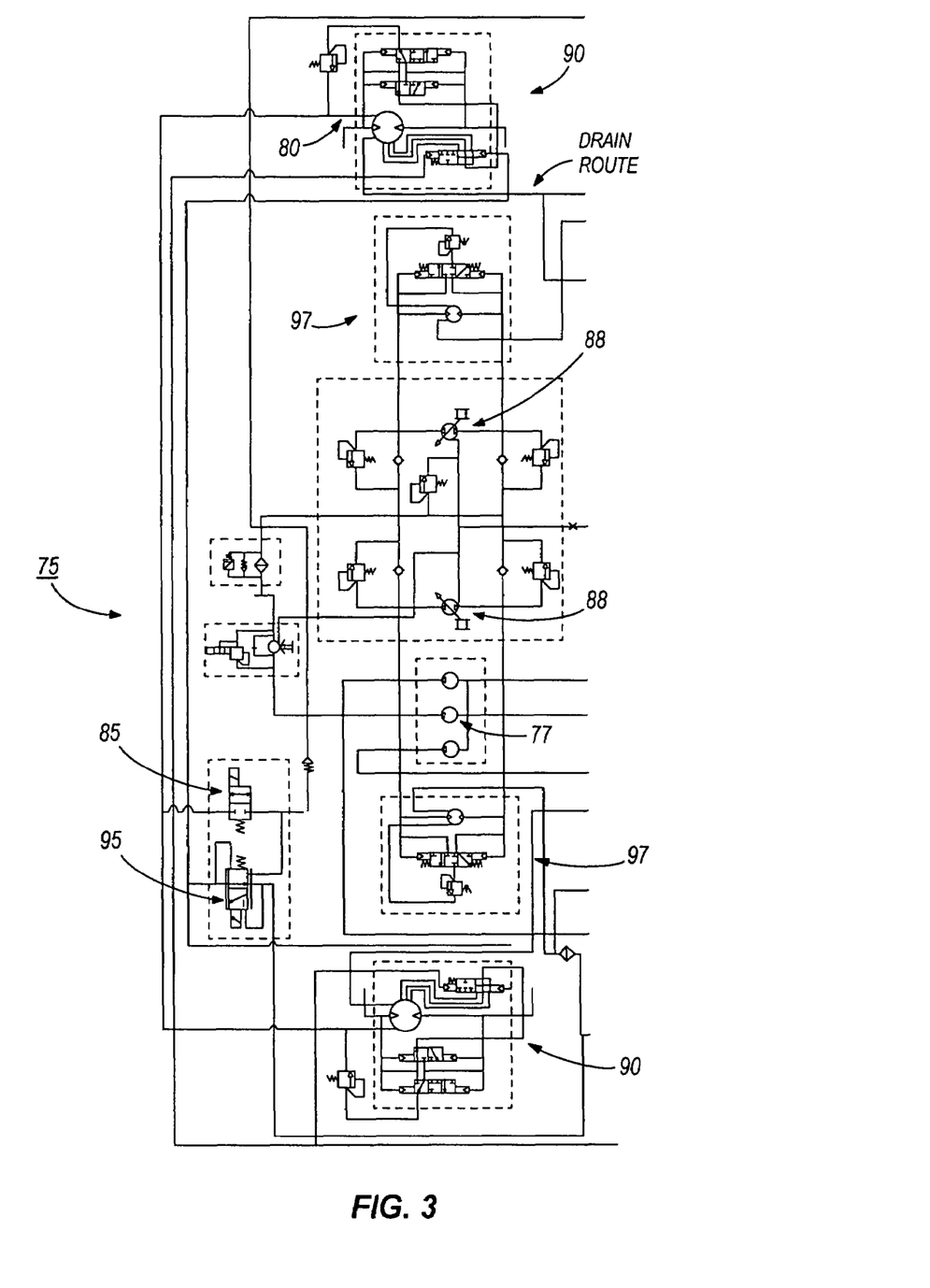
FIG. 3 is a portion of a schematic for a hydraulic system.

FIG. 3 is a portion of a schematic for a hydraulic system 75. In some embodiments the hydraulic system 75 can be utilized in the skid steer loader 10 shown in FIGS. 1 and 2. However, in other embodiments, the hydraulic system 75 may be adapted to be utilized with a variety of different machines having hydraulic systems (e.g., a crane, front-end loader, etc.).

The hydraulic system 75 shown in FIG. 3 includes a relatively closed hydraulic circuit. However, to provide the hydraulic system 75 with a relatively constant, pressurized source of hydraulic fluid, the hydraulic system 75 may include a charge pump 77. For example, the charge pump 77 operates in an open circuit by drawing fluid out of a reservoir, pressurizing the fluid, and introducing it to the closed hydraulic system 75. As a result, the hydraulic system 75 is pressurized by the charge pump 77 to a "charge pressure," and pressurized hydraulic fluid from the charge pump 77 instantly supplements the hydraulic fluid in the hydraulic system 75. Hydraulic fluid may exit the hydraulic system 75 through the hydraulic fluid drain route. In other embodiments, a variety of pumps or other devices can be used to provide a relatively constant source of consistent pressure. For example, in another embodiment, an implement pump can be used to pressurize the hydraulic fluid.

In some embodiments, the hydraulic system 75 also includes a fluid flushing path 80. Generally, the fluid flushing path 80 is independent of, or separated from, a path that is used to drive one or more hydraulic motors of the hydraulic system (described below). For example, in some embodiments, the fluid flushing path 80 is a lubrication path that is integrated into a case or housing of a hydraulic motor (as described in greater detail below) included in the hydraulic system 75. In another embodiment, the fluid flushing path 80 is configured differently (e.g., a path integrated into the housing of the internal combustion engine 30). The fluid flushing path 80 can be utilized as a warming path to warm hydraulic fluid to a desired temperature. For example, in some instances, the performance characteristics of hydraulic fluid change with temperature. Relatively cold hydraulic fluid may be too viscous to provide optimal lubrication and flow characteristics. Hydraulic fluid may be relatively cold at start-up (e.g., before a hydraulic motor has been rotating). Accordingly, the fluid flushing path 80 may be used to pre-warm the hydraulic fluid to increase the temperature to a desired level, as described in greater detail below. Additionally, the fluid flushing path 80 can be utilized as a warming path to warm other hydraulic components (e.g., components of a hydraulic motor). For example, embodiments which integrate the fluid flushing path 80 into a case or housing of a hydraulic motor can use the hydraulic fluid traveling through the fluid flushing path 80 to warm the components of the motor.

A valve or "fluid flushing spool" 85 can be used to allow hydraulic fluid to flow from the charge pump to the fluid flushing path 80. For example, when the fluid flushing spool 85 is actuated (e.g., energized), hydraulic fluid is forced from the charge pump 77 into the fluid flushing path 80. When the fluid flushing spool 85 is deactivated (e.g., de-energized), hydraulic fluid is prevented from entering the fluid flushing path 80. In the embodiment shown in FIG. 3, the fluid flushing spool 85 includes a normally-closed solenoid valve. In some embodiments, the fluid flushing spool 85 can include a pulse width modulated ("PWM") valve. In such embodiments the PWM valve can be used to control the flow rate through the fluid flushing path 80 based on temperature and/or charge pressure feedback.

In the embodiment shown in FIG. 3, the hydraulic system 75 includes two hydraulic pumps 88 which provide hydraulic fluid to two speed hydraulic motors 90. Accordingly, the hydraulic system 75 can shift the motors 90 between a low-speed high-torque ("LSHT") mode and a high-speed low-torque ("HSLT") mode. The hydraulic system 75 shifts the motors 90 between the LSHT mode and the HSLT mode by changing the ratio of output shaft rotation to the flow rate of hydraulic fluid supplied by the hydraulic pump in the hydraulic system. As such, in the embodiment shown, the hydraulic system 75 provides a variable flow rate of hydraulic fluid to the motors 90. Additionally, in the embodiment shown, the hydraulic motors 90 do not include balancing plates, and have fixed internal clearances. In other embodiments, however, the hydraulic motors 90 may be configured differently, for example, including a balancing plate that compensates for variations in clearances.

Another valve, or "shifting spool" 95 in the hydraulic system 75 can be used to enable or disable the ability to shift from the LSHT mode to the HSLT mode. For example, when the shifting spool 95 is actuated (e.g., energized), the hydraulic motors 90 can be shifted from the LSHT mode to the HSLT mode. Alternatively, when the shifting spool 95 is deactivated (e.g., de-energized), the HSLT mode is unavailable (e.g., the machine is forced to operate in the lower speed mode). The HSLT mode may be disabled, as described in greater detail below, when the hydraulic fluid is not within a desired operating temperature range.

In some embodiments, the hydraulic system 75 can be adapted to utilize single speed hydraulic motors 97. Accordingly, the single speed hydraulic motors 97 can be prevented from operating (e.g., using a brake device) if the hydraulic fluid is not within a desired operating range. In other embodiments, the hydraulic system 75 can be adapted to utilize hydraulic motors that can operate at three or more speeds.

Figure 4:
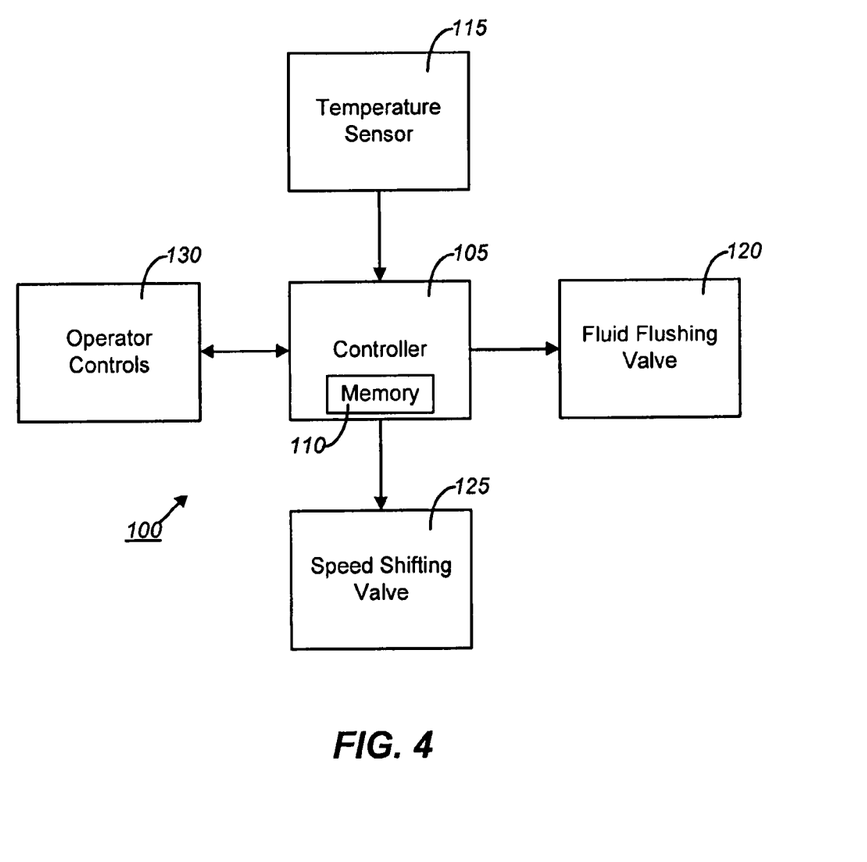
FIG. 4 is a block diagram of a control system.

FIG. 4 is a block diagram of a control system 100. In some embodiments, the control system 100 can be used to control components of a machine, such as the skid steer loader 10 shown in FIGS. 1 and 2. The control system 100 generally includes a controller 105 having a memory 110, a temperature sensor 115, a fluid flushing valve 120, a speed shifting valve 125, and one or more operator controls 130. In other embodiments, the control system 100 may include more or fewer components than those shown. For example, in another embodiment, the control system 100 includes a variety of other valves (e.g., a lift valve, an auxiliary valve, etc.) and a variety of other sensors (e.g., speed sensors, proximity switches, limit switches, etc.).

The controller 105 is a suitable electronic device, such as, for example, a programmable logic controller ("PLC"), a microprocessor, a computer ("PC"), or other similar computing devices. As such, the controller 105 may include both hardware and software components, and is meant to broadly encompass combinations of such components. The controller 105 includes a memory 110. The memory 110 can include a variety of different types of memory structures, such as, for example, random-access memory ("RAM"), read-only memory ("ROM"), flash memory, and the like. In the embodiment shown in FIG. 4, the memory 110 is incorporated into the controller 105. However, in other embodiments, the memory 110 may be included in a structure separate from the controller 105. Generally, the controller 105 executes a variety of processes (e.g., as shown and described with respect to FIGS. 5-9) to carry out a variety of tasks. Programs corresponding to these processes can be stored in the memory 110.

In the embodiment shown in FIG. 4, the temperature sensor 115 generates a signal indicative of the temperature of hydraulic fluid included, for example, in the hydraulic system 75. In some embodiments, the temperature sensor 115 generates a variable signal that corresponds to a sensed temperature. For example, the temperature sensor 115 may be an analog sensor that generates a variable output voltage according to the temperature of the hydraulic fluid. In another embodiment, the temperature sensor 115 generates a relatively constant output signal in response to the temperature of the hydraulic fluid exceeding a temperature threshold (e.g., the output is "ON" or "OFF").

The fluid flushing valve 120 and the speed shifting valve 125 are used to actuate a fluid flushing function and a speed shifting function, respectively. For example, similar to the fluid flushing valve 85 shown in FIG. 3, the fluid flushing valve 120 can be actuated to provide a flow of hydraulic fluid to a fluid flushing flow path. Additionally, similar to the speed shifting valve 95 shown in FIG. 3, the speed shifting valve 125 can be actuated to enable a high speed mode. The fluid flushing valve 120 and the speed shifting valve 125 are actuated by the controller 105. For example, the controller 105 transmits a control signal to the fluid flushing valve 120 and the speed shifting valve 125 to actuate them.

The operator controls 130 can include a variety of push buttons, toggle switches, selector knobs, joysticks, pedals, levers, and the like. The operator controls 130 provide a variety of signals to the controller 105 that are indicative of the position or state of the operator controls 130. Depending on the configuration of the controller and the controls, the controller 105 can also be configured to transmit signals to the operator controls 130 to provide visual, audible, or other indications to a user regarding the state of a machine function. For example, the controller 105 can transmit a signal to a pushbutton having a light emitting diode ("LED") to indicate to an operator that the pushbutton has been depressed and the function corresponding to the pushbutton has been activated.

Figures 5, 6:
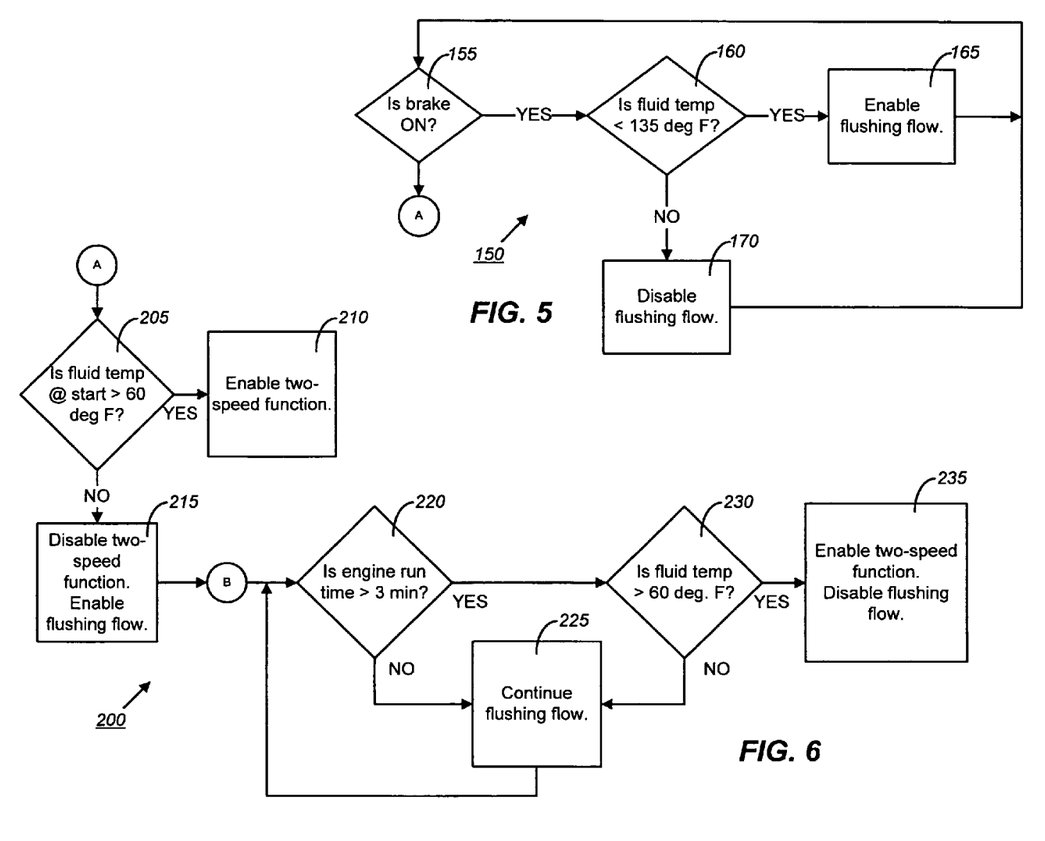
FIG. 5 is a process for controlling a flow of hydraulic fluid.
FIG. 6 is a process for controlling a speed function of a machine and a flow of hydraulic fluid.

FIG. 5 is a process 150 that can be utilized for controlling a flushing flow of hydraulic fluid. For example, the process 150 can be utilized to control a flushing flow of hydraulic fluid in a machine, such as the skid steer loader 10 shown in FIG. 1. The process 150 begins by determining whether a brake of the machine is actuated (step 155). If the brake is not actuated (i.e., the brake is OFF), the process 150 continues at reference point A, as shown and described with respect to FIG. 6. If the brake is actuated (i.e., the brake is ON), the temperature of the hydraulic fluid in the machine is measured and/or compared to a temperature threshold (step 160). In some embodiments, the temperature threshold is set in accordance with one or more performance characteristics of the hydraulic fluid. For example, the temperature threshold may be a high limit temperature threshold of the hydraulic fluid, above which the hydraulic fluid is rendered less effective (e.g., the fluid loses at least a portion of its lubrication and/or other desired characteristics). In the embodiment shown in FIG. 5, the temperature threshold is 135 degrees Fahrenheit. In other embodiments, the temperature threshold may be set to a different temperature, depending on the type of hydraulic fluid being utilized or the application in which the hydraulic fluid is being utilized. If the hydraulic fluid is below the temperature threshold, the flushing flow is actuated (step 165). If the hydraulic fluid is at or above the temperature threshold, the flushing flow is not actuated (step 170).

FIG. 6 illustrates a process 200 that can be utilized to control a flushing flow of hydraulic fluid and a multi-speed function of a machine, such as the skid steer loader 10 shown in FIG. 1. Generally, the process 200 is initialized when a brake of the machine is not actuated (e.g., as determined in step 155 of FIG. 5). If the brake is not actuated (i.e., the brake is OFF), the next step in the process 200 is to measure and/or compare the temperature of the hydraulic fluid to a temperature threshold (step 205). In some embodiments, the temperature threshold, similar to the temperature threshold described with respect to FIG. 5, is set in accordance with one or more performance characteristics of the hydraulic fluid. For example, the temperature threshold may be a low limit temperature threshold of the hydraulic fluid, below which the hydraulic fluid is rendered less effective. In the embodiment shown in FIG. 6, the temperature threshold is 60 degrees Fahrenheit. However, in other embodiments, the temperature threshold may be altered according the type or application of the hydraulic fluid. If the temperature of the hydraulic fluid is above the temperature threshold, a high speed function of the machine is allowed (step 210). Allowing a high speed function of the machine, for example, allows a signal to be sent from a controller to a speed shifting valve, thereby actuating the valve (e.g., see FIG. 4). If the temperature of the hydraulic fluid is below the temperature threshold, a high speed function is disabled (step 215). Disabling a high speed function of the machine, for example, prevents a signal from being sent to a speed shifting valve (e.g., see FIG. 4). Additionally, a flushing flow function is actuated (step 215). As described above, the flushing flow can be used to increase the temperature of the hydraulic fluid as well as other hydraulic components (e.g. the hydraulic motor), which allows the hydraulic fluid to reach a temperature at which its performance characteristics reach an acceptable level.

After the high speed function has been disabled and the flushing flow has actuated (step 215), the process 200 continues by determining a duration that an engine of the machine has been running (step 220). Additionally, another process is initiated, as indicated by reference point B and as shown and described with respect to FIG. 7. Continuing with the process 200 shown in FIG. 6, if the engine of the machine has not been running for at least three minutes, the flushing flow continues to run (step 225). After the engine has been running for at least three minutes, the temperature of the hydraulic fluid is read and compared to the temperature threshold (e.g., 60 degrees Fahrenheit) (step 230). If the temperature of the hydraulic fluid does not meet or exceed the temperature threshold, the flushing flow continues to run (step 225). After the temperature of the hydraulic fluid exceeds the temperature threshold, the high speed function is enabled and the flushing flow of the hydraulic fluid is turned off (step 235). In some embodiments, if the temperature of the hydraulic fluid exceeds the temperature threshold (e.g., the temperature threshold of step 215), the process shown in FIG. 7 is disabled.

The process 200 shown in FIG. 6 is described with respect to controlling a high speed function of a hydraulic motor (e.g., a motor that is configured to run at multiple speeds). However, in other embodiments, the process 200 can be adapted for controlling the operation a single speed motor (e.g., a single speed motor that has a relatively high rate of operation). For example, the process 200 can be altered to disable operation of the single speed motor until the hydraulic fluid reaches a desired temperature. In this way, damage resulting from inadequately heated hydraulic fluid or hydraulic components can be avoided.

Figure 7:
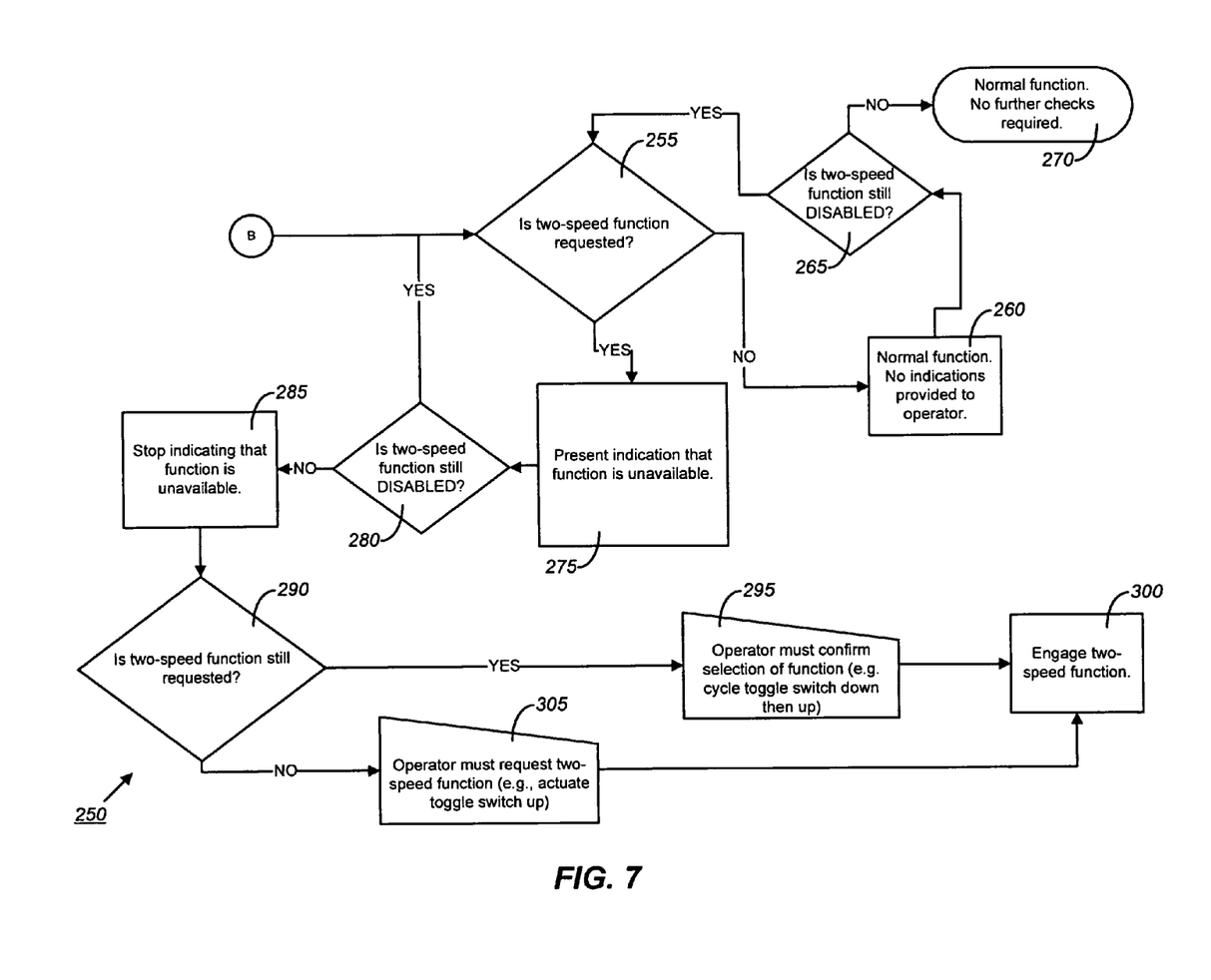
FIG. 7 is a process for controlling an operator interface.

FIG. 7 illustrates a process 250 for controlling an operator interface in a machine, such as the skid steer loader 10 shown in FIG. 1. The process 250 is initiated after a function (e.g. the high speed function described in step 215 of FIG. 6) has been disabled. The process 250 begins by determining if a user has requested the function that has been disabled (step 255). For example, in some embodiments, a user requests a function of the machine by depressing a momentary push button. As noted, other input devices may also be used. If the function that the user requests is available, the machine functions normally and no indications are provided to the operator (step 260). In some embodiments, the next step in the process 250 is to determine whether the requested function is still disabled (step 265). If the function is not disabled, the machine functions normally and no further processing is required (step 270). If the function is disabled, the process 250 returns to step 255 and determines if the function is still being requested by the user.

If the user has requested a function and the function is unavailable (e.g., has been disabled) a visual, audible, or other indication is presented to the user (step 275). For example, if a user depresses a pushbutton to enable a high speed function of the machine, an LED of the pushbutton may begin to flash. Additionally or alternatively, a warning horn or buzzer may be initiated. The next step in the process 250 is to determine whether the requested function is still disabled (step 280). If the requested function is still disabled, the process 250 returns to step 255 and determines if the function is still being requested by the user. If the function is no longer disabled, the next step in the process 250 is to stop providing the indication that the function is unavailable (step 285). After the indication has been stopped, the next step in the process 250 is to determine if the function is still being requested (step 290). For example, if a toggle switch was actuated, the next step in the process 250 is to determine if the toggle switch is still in an ON position. If the function is still being requested, the operator must provide a confirmation that the function is still desired (step 295). For example, the operator may cycle the toggle switch to an OFF position, and then back to the ON position. In another embodiment, the user may be required to depress a pushbutton. After the confirmation has been made, the function is engaged (step 300). If the function is not still being requested, the operator must request the function (step 305) prior to the function being engaged (step 300).

Figure 8:
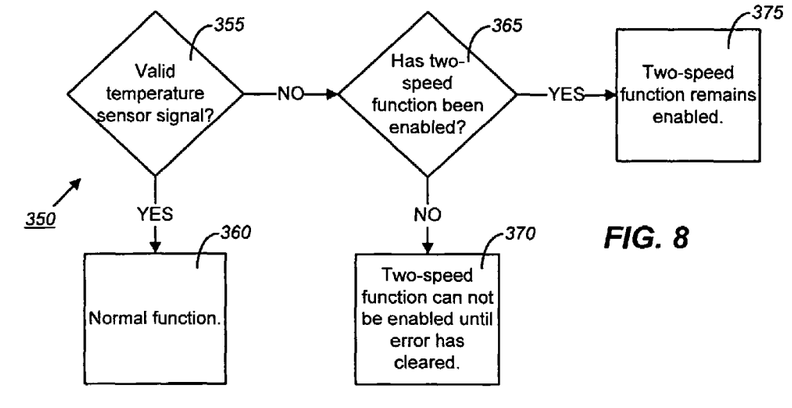
FIG. 8 is a process for detecting an error condition.

FIG. 8 illustrates a process 350 that can be used to detect an error condition associated with a machine, such as the skid steer loader 10 shown in FIG. 1. For example, the process 350 can be used to detect an error condition associated with a temperature sensor, such as a temperature sensor being used to measure the temperature of the hydraulic fluid. The first step in the process 350 is to determine whether the signal from the sensor is valid (step 355). Signals outside of an expected signal range may be considered to be invalid. For example, a signal that is approximately zero may indicate that a short circuit has been completed to ground. A signal that is outside of an upper signal range or boundary may indicate that a short circuit condition exists. A signal that is absent (i.e., no signal) may indicate that the sensor has been unplugged or is otherwise disconnected (e.g., an open circuit condition exists). If the signal is valid, normal operation of the machine is allowed (step 360).

If the signal from the temperature sensor is invalid (e.g., there is a signal error), operation of the machine is controlled in a predetermined manner. For example, in some embodiments, the next step in the process 350 is to determine whether a high speed functionality (described above) has been previously enabled (step 365). If the high speed function has not been previously enabled, the high speed functionality is disabled (step 370) until a valid signal is received from the temperature sensor (step 355). Disabling the high speed function can help to ensure that the two-speed function is not actuated until it can be determined that the hydraulic fluid is within a desired temperature range. In doing so, accidental and/or premature actuation of a high speed mode that can lead to equipment failure is avoided. However, in one embodiment, provided the high speed function has been previously enabled, the later loss of a valid signal from the temperature sensor will not cause disablement of the high speed function (step 375). If the machine is turned off or otherwise loses power, however, the high speed function may be disabled until a valid signal is provided from the temperature sensor.

Figure 9:
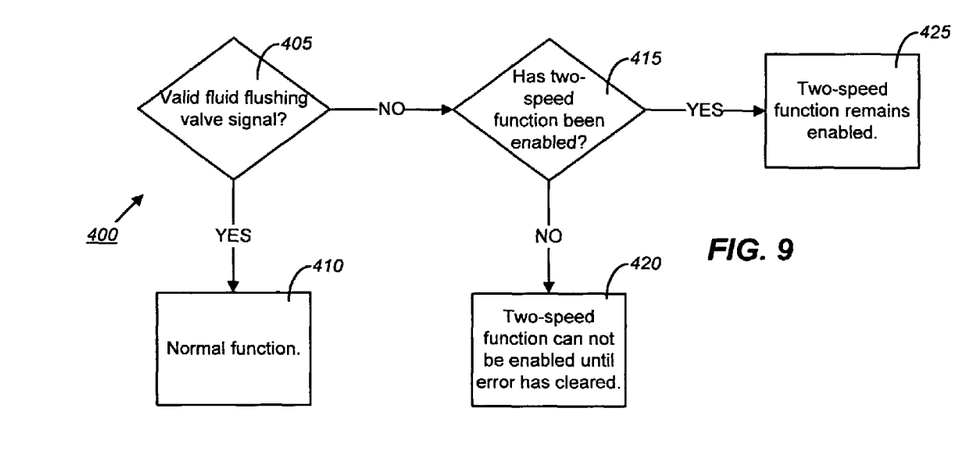
FIG. 9 is a process for detecting another error condition.

FIG. 9 illustrates a process 400 that can be used to detect an error condition associated with a valve, such as a fluid flushing valve that controls a flow of hydraulic fluid into a fluid flushing path. The first step in the process 400 is to determine whether the signal from the valve is valid (step 405). As previously described, signals that are out of an expected signal range are generally considered to be invalid. If the signal from the valve is valid, normal operation of the machine is allowed (step 410).

In some embodiments, the next step in the process 400 is to determine whether a high speed functionality has been previously enabled (step 415). If a high speed function has not been previously enabled, high speed functionality is disabled until a valid signal is received from the valve (step 420). As noted, disabling the high speed function can help to ensure that the high speed function is not actuated until the hydraulic fluid has been flushed through the flushing fluid flow path (e.g., the hydraulic fluid and hydraulic components (e.g. hydraulic motor) has been pre-warmed). In doing so, accidental and/or premature actuation of a high speed mode when the hydraulic fluid is outside of a desired operational range can be avoided. Similar to the embodiment described with respect to FIG. 8, provided the high speed function has been previously enabled, the later loss of a valid signal from the valve will not cause disablement for the high speed function (step 425). If the machine is turned off or otherwise loses power, however, the high speed function is disabled until a valid signal is provided from the valve.

Various features and advantages of the invention are set forth in the following claims.

What is claimed is:

1. A method of operating a hydraulic motor, the method comprising:
   measuring a temperature of hydraulic fluid associated with the hydraulic motor;
   comparing the measured temperature of the hydraulic fluid to a first temperature threshold;
   controlling an operational state of one or more hydraulic motor functions based at least partially on the comparison of the measured temperature of the hydraulic fluid and the first temperature threshold;
   actuating a valve to force the hydraulic fluid through a pre-warming path if the measured temperature of the hydraulic fluid is below the first temperature threshold;
   identifying an error condition associated with either he valve or with measuring the temperature of the hydraulic fluid; and
   limiting a speed of the hydraulic motor upon identifying the error condition associated width either the valve or with measuring the temperature of the hydraulic fluid.

2. The method of claim 1, further comprising setting the first temperature threshold to approximately 60 degrees Fahrenheit.

3. The method of claim 1, wherein controlling an operational state includes disabling a speed function of the hydraulic motor based at least partially on the comparison of the measured temperature of the hydraulic fluid and the first temperature threshold.

4. The method of claim 3, wherein the speed function is disabled when the temperature of the hydraulic fluid is below the first temperature threshold.

5. The method of claim 1, further comprising requiring a confirmation that a change in the operational state of one or more of the hydraulic motor functions is desired.

6. A method of operating a machine having a hydraulic motor that utilizes hydraulic fluid, the method comprising:
   measuring a temperature of the hydraulic fluid;
   determining whether the temperature of the hydraulic fluid is below a first temperature threshold;
   enabling a flow of hydraulic fluid into a warming flow path when the temperature of the hydraulic fluid is below the first temperature threshold, the warming flow path being independent of a driving flow path used to drive the hydraulic motor;
   limiting a speed with which the hydraulic motor operates, in response to an operator control, to a first speed while prohibiting the hydraulic motor from operating at a second higher speed when the temperature of the hydraulic fluid is below the first temperature threshold; and
   disabling the flow of hydraulic fluid into the second flow path and removing the speed limit upon the temperature of the hydraulic fluid meeting or exceeding the first temperature threshold.

7. The method of claim 6, further comprising enabling the flow of hydraulic fluid into the warming path by actuating a first valve.

8. The method of claim 6, further comprising limiting the speed with which the hydraulic motor operates by preventing the actuation of a second valve.

9. The method of claim 6, further comprising enabling the flow of hydraulic fluid into the warming flow path by diverting the hydraulic fluid into the warming flow path using a pump.

10. The method of claim 6, further comprising enabling the flow of hydraulic fluid into the warming path when the hydraulic motor is prevented from operating and the temperature of the hydraulic fluid is below a second temperature threshold.

11. The method of claim 6, further comprising indicating that the speed of the hydraulic motor is being limited, the indication being visual or audible.

12. The method of claim 6, further comprising requiring a confirmation that an increased speed is desired upon the speed limit being removed.

13. The method of claim 6, further comprising identifying an error condition associated with measuring the temperature of the hydraulic fluid or limiting the speed of the hydraulic motor.

14. A method for controlling a hydraulic system that includes a pump for causing a flow of hydraulic fluid, a motor capable of multiple speed operation in response to the flow of hydraulic fluid, the motor having a lubrication circuit, and brake preventing operation of the motor when the brake is on and permitting operation of the motor when the brake is off, the method comprising the steps of:
   (a) determining whether the brake is on;
   (b) determining whether an operator is requesting operation of the motor at a high speed;
   (c) determining a temperature of the hydraulic fluid;
   (d) flowing the hydraulic fluid through a pre-warming circuit into the lubrication circuit in the motor upon the determination that the brake is on and the temperature of the hydraulic fluid is below a high limit,
   (e) flowing the hydraulic fluid through a pre-warming circuit into the lubrication circuit and preventing operation of the motor at high speed upon the determination that the brake is off and the temperature of the hydraulic fluid is below a low limit;
   (f) alerting the operator that the motor is being prevented from operation at high speed when the operator attempts to operate the motor at high speed operation during step (e);
   (g) enabling operation of the motor at high speed following step (e) when the temperature of the hydraulic fluid is equal to or above the low limit and while the brake is off; and
   (h) requiring a confirmatory act of the operator prior to permitting operation of the motor at high speed in the event the operator was alerted during step (f).

* * * * *

UNITED STATES PATENT AND TRADEMARK OFFICE
CERTIFICATE OF CORRECTION

PATENT NO. : 7,614,223 B2 Page 1 of 1
APPLICATION NO. : 11/731814
DATED : November 10, 2009
INVENTOR(S) : St. Aubin et al.

It is certified that error appears in the above-identified patent and that said Letters Patent is hereby corrected as shown below:

Column 9,

Line 29, delete "he" and insert --the--.

Line 33, delete "width" and insert --with--.

Signed and Sealed this

Twenty-third Day of February, 2010

David J. Kappos
*Director of the United States Patent and Trademark Office*